US010139117B2

(12) United States Patent
Kim

(10) Patent No.: US 10,139,117 B2
(45) Date of Patent: Nov. 27, 2018

(54) WALL-MOUNTED SMART DEHUMIDIFIER

(71) Applicant: Merit Co., Ltd., Daejeon (KR)

(72) Inventor: Ki Tai Kim, Daejeon (KR)

( * ) Notice: Subject to any disclaimer, the term of this patent is extended or adjusted under 35 U.S.C. 154(b) by 275 days.

(21) Appl. No.: 15/151,634

(22) Filed: May 11, 2016

(65) Prior Publication Data

US 2017/0003041 A1 Jan. 5, 2017

(30) Foreign Application Priority Data

Jul. 1, 2015 (KR) ........................ 10-2015-0093890

(51) Int. Cl.
| F24F 3/153 | (2006.01) |
|---|---|
| F25B 21/02 | (2006.01) |
| F24F 13/22 | (2006.01) |
| F24F 5/00 | (2006.01) |
| F24F 11/30 | (2018.01) |

(Continued)

(52) U.S. Cl.
CPC ............ F24F 3/153 (2013.01); F24F 5/0042 (2013.01); F24F 11/30 (2018.01); F24F 11/77 (2018.01); F24F 13/222 (2013.01); F25B 21/02 (2013.01); F24F 11/52 (2018.01); F24F 11/58 (2018.01); F24F 11/85 (2018.01); F24F 2003/1452 (2013.01); F24F 2110/10 (2018.01); F24F 2110/20 (2018.01); F25B 21/04 (2013.01); F25B 2321/0212 (2013.01); Y02B 30/746 (2013.01)

(58) Field of Classification Search
CPC ...... F24F 2110/20; F24F 3/153; F24F 5/0042; F25B 21/02; F25B 2321/0212; F25B 21/04

USPC .......................................................... 62/3.4
See application file for complete search history.

(56) References Cited

U.S. PATENT DOCUMENTS

| 3,740,959 A * | 6/1973 | Foss ...................... F24F 3/1417 |
|---|---|---|
| | | 261/80 |
| 4,711,294 A * | 12/1987 | Jacobs .................... F24F 3/153 |
| | | 165/230 |

(Continued)

FOREIGN PATENT DOCUMENTS

| KR | 10-2012-0094731 | 8/2012 |
|---|---|---|
| KR | 10-1205301 | 11/2012 |

(Continued)

OTHER PUBLICATIONS

English translation of 10-1205301.

(Continued)

Primary Examiner — Frantz Jules
Assistant Examiner — Lionel Nouketcha
(74) Attorney, Agent, or Firm — Antonio Ha & U.S. Patent, LLC

(57) ABSTRACT

According to an embodiment of the present invention, a dehumidifier comprises a cooling water vessel containing cooling water, a dehumidifying space formed above the cooling water vessel to which air is introduced through an air inlet, a thermoelectric device including a heating part heating the air and a cooling part cooling the cooling water, a water pump circulating the cooling water through the thermoelectric device, a first fan disposed adjacent the air inlet to cause the air to flow through the dehumidifying space, and a controller controlling the thermoelectric device, the water pump, and the first fan.

16 Claims, 12 Drawing Sheets

(51) Int. Cl.
*F24F 11/77* (2018.01)
*F24F 3/14* (2006.01)
*F25B 21/04* (2006.01)
*F24F 110/10* (2018.01)
*F24F 110/20* (2018.01)
*F24F 11/58* (2018.01)
*F24F 11/85* (2018.01)
*F24F 11/52* (2018.01)

(56) References Cited

U.S. PATENT DOCUMENTS

| | | | | |
|---|---|---|---|---|
| 6,418,728 B1* | 7/2002 | Monroe | ............... | F24F 5/0035 |
| | | | | 62/3.2 |
| 7,861,539 B2* | 1/2011 | Wu | ................ | F04D 29/705 |
| | | | | 62/3.64 |
| 2012/0036869 A1* | 2/2012 | Kim | ................ | F25B 21/02 |
| | | | | 62/3.4 |

FOREIGN PATENT DOCUMENTS

KR 10-2013-0057729 6/2013
KR 10-2015-0069873 6/2015

OTHER PUBLICATIONS

English translation of 10-2015-0069873.
English translation of 10-2012-0094731.
English translation of 10-2013-0057729.

* cited by examiner

WALL-MOUNTED SMART DEHUMIDIFIER

CROSS-REFERENCE TO RELATED APPLICATIONS

This patent application claims priority under 35 U.S.C. § 119 to Korean Patent Application No. 10-2015-0093890, filed on Jul. 1, 2015, in the Korean Intellectual Property Office, the disclosure of which is incorporated by reference herein in its entirety.

TECHNICAL FIELD

The present disclosure relates to a wall-mounted smart dehumidifier providing dehumidification and humidification, and more particularly, to a wall-mounted smart dehumidifier which is configured to maintain a temperature of cooling water within a desirable range and minimize power consumption using condensation of ambient air passing above the cooling water.

DISCUSSION OF RELATED ART

A dehumidifier is generally a household appliance which reduces the level of humidity in the air, usually for health or comfort reasons, or to eliminate musty odor. Large dehumidifiers are also used in commercial buildings such as indoor ice rinks to control the humidity level.

Various types of dehumidifiers are coming to the market. Among others, thermoelectric dehumidifiers use a Peltier heat pump to cool a surface and condense water vapor from the air. The design is simpler and has the benefit of being quieter compared to a dehumidifier with a mechanical compressor. However, because of its relatively poor coefficient of performance, this design is mainly used for small dehumidifiers. Ice buildup and significant power consumption may be a problem with such type of dehumidifiers. Therefore, a need exists for a compact dehumidifier that may address such issues.

SUMMARY

According to an embodiment of the present invention, there is provided a dehumidifier introducing external air through an air inlet 11 to an inside thereof, dehumidifying the introduced air using a thermoelectric device 40 powered on/off by a controller 70 in the dehumidifier, and discharging the dehumidified air through an air outlet 12, wherein a dehumidifying space is formed on a water surface of a cooling water vessel 20 containing cooling water so that the air is introduced to the dehumidifying space and dehumidified by the cooling water, wherein the dehumidified air in the dehumidifying space is heated by a heating part of the thermoelectric device 40 and is then discharged through the air outlet 12, wherein the cooling water in the cooling water vessel 20 is circulated and cooled through a cooling part of the thermoelectric device 40 by a water pump 50, wherein the cooling water vessel 20 extends from a lower portion of the air inlet 11 at a first side to a lower portion of the thermoelectric device 40 at a second side, wherein the dehumidifying space is formed as a passage extending from the air inlet 11 at the first side to the thermoelectric device 40 at the second side, and wherein a first fan 60 is provided at the air inlet 11 so that the air introduced into the dehumidifying space by the first fan 60 passes along the water surface of the cooling water contained in the cooling water vessel 20 to the heating part of the thermoelectric device 40.

A second fan 61 is provided at a lower end of the heating part of the thermoelectric device 40, wherein the air outlet 12 is provided at an upper portion of the heating part of the thermoelectric device 40, and wherein the air in the dehumidifying space is ascended by the second fan 61 and is discharged through the heating part of the thermoelectric device 40 and the air outlet 12.

The dehumidifier comprises a temperature sensor measuring a temperature of the cooling water in the cooling water vessel 20 and a humidity sensor measuring a humidity of the external air, wherein the controller 70 operates the first fan 60 and the second fan 61 when the humidity exceeds a predetermined threshold humidity to perform dehumidification, and when the temperature of the cooling water measured while the dehumidification exceeds a predetermined threshold temperature, the controller 70 supplies electricity to the thermoelectric device 40 while circulating the cooling water by the water pump 50 so that the temperature of the cooling water remains at the threshold temperature or less.

The dehumidify comprises a temperature sensor measuring a temperature of the cooling water in the cooling water vessel 20 and a humidity sensor measuring a humidity of the external air, wherein the controller 70 controls power supplied to the thermoelectric device 40 to perform a low-power operation and a full-power operation where relatively higher power is supplied than power supplied during the low-power operation, wherein when the humidity is a threshold humidity or less, the controller 70 stops the thermoelectric device 40, the water pump 50, and first and second fans, and when the humidity exceeds the threshold humidity, the controller 70 operates the water pump 50 and the first and second fans while running the thermoelectric device 40 in the full-power operation when the temperature of the cooling water exceeds a predetermined threshold temperature and in the low-power operation when the temperature of the cooling water is the threshold temperature or less.

When the humidity is the threshold humidity or less, the controller 70 keeps stopping the first fan, and wherein when the temperature of the cooling water reaches an upper limit of a maintenance temperature range previously set to be relatively higher than the threshold temperature, the controller 70 runs the thermoelectric device 40 in the full-power operation and operates the water pump 50 and the second fan, and when the temperature of the cooling water reaches a lower limit of the maintenance temperature range previously set to be higher the threshold temperature and lower than the upper limit of the maintenance temperature range, the controller 70 runs the thermoelectric device 40 in the low-power operation and stops the water pump 50 and the second fan.

A water tank 30 is disposed under the cooling water vessel 20, and wherein a water level of the cooling water vessel 20 is adjusted by a drain tube 22 draining the cooling water to the water tank 30 when the water level of the cooling water vessel 20 exceeds a predetermined water level.

The cooling water vessel 20 includes a water supplying inlet for adding water from an external source, wherein the water tank 30 is externally removed, and wherein when the water pump 50 operates with no load, the controller 70 determines that the cooling water is not present in the cooling water vessel 20 and generates an alert, and wherein the controller 70 detects a water level of the water tank 30 through a water level detector 74 and generates an alert when the water level of the water tank 30 exceeds a predetermined water level.

A waterwheel is provided to surround a circumference of the first fan, the waterwheel and the first fan forming a single body, wherein the external air is introduced by rotation of the waterwheel, and wherein the cooling water returned through the cooling part of the thermoelectric device 40 to the cooling water vessel 20 by the water pump 50 is dropped to the cooling water vessel 20 while rotating the waterwheel.

The cooling water returned through the cooling pan of the thermoelectric device 40 to the cooling water vessel 20 by the water pump 50 is sprayed to the water surface of the cooling water vessel 20 to remove dust in the air passing through the dehumidifying space over the water surface.

According to an embodiment of the present invention, a dehumidifier comprises a cooling water vessel containing cooling water, a dehumidifying space formed above the cooling water vessel to which air is introduced through an air inlet, a thermoelectric device including a heating part heating the air and a cooling part cooling the cooling water, a water pump circulating the cooling water through the thermoelectric device, a first fan disposed adjacent the air inlet to cause the air to flow through the dehumidifying space, and a controller controlling the thermoelectric device, the water pump, and the first fan.

The cooling water vessel extends from a lower portion of the air inlet to a lower portion of the thermoelectric device, wherein the dehumidifying space has a passage shape extending from a side of the air inlet to a side where the thermoelectric device is placed, and wherein the air introduced through the air inlet is dehumidified in the dehumidifying space and passes through the thermoelectric device.

The dehumidifier further comprises a second fan disposed at a lower end of the heating part of the thermoelectric device and an air outlet disposed at an upper portion of the heating part of the thermoelectric device, wherein the air is discharged from the dehumidifying space through the heating part of the thermoelectric device and the air outlet to an outside of the dehumidifier by an operation of the second fan.

The dehumidifier further comprises a humidity sensor measuring a humidity of the air and a temperature sensor measuring a temperature of the cooling water.

When the humidity exceeds a predetermined threshold humidity, the controller operates the first and second fans to dehumidify the air, and when the temperature of the cooling water exceeds a predetermined threshold temperature, the controller operates the water pump and the thermoelectric device to maintain the temperature of the cooling water below the threshold temperature.

The thermoelectric device is operated in a low-power operation mode or a full-power operation mode by the controller.

When the humidity is equal to or lower than a predetermined threshold humidity, the thermoelectric device, the water pump, and the first and second fans do not operate, and when the humidity exceeds the predetermined threshold humidity, the thermoelectric device runs in the full-power operation mode when the temperature of the cooling water exceeds a predetermined threshold temperature, and the thermoelectric device runs in the low-power operation mode when the temperature of the cooling water is lower than the predetermined threshold temperature, while both the water pump and first and second fans operate.

When the humidity is equal to or lower than the predetermined threshold humidity, and the temperature of the cooling water reaches an upper limit of a predetermined maintenance temperature range, which is higher than the predetermined threshold temperature, the thermoelectric device runs in the full-power operation mode while the water pump and the second fan operate, and when the humidity is equal to or lower than the predetermined threshold humidity and the temperature of the cooling water reaches a lower limit of the predetermined maintenance temperature range, which is higher than the predetermined threshold temperature but lower than the upper limit of the predetermined maintenance temperature, the thermoelectric device runs in the lower-power operation mode while the water pump and the second fan do not operate.

The dehumidifier further comprises a water tank disposed below the cooling water vessel and a drain tube disposed between the cooling water vessel and the water tank, wherein of the cooling water is drained from the cooling water vessel to the water tank when a water level of the cooling water vessel reaches a predetermined level.

The dehumidifier comprises a water supplying inlet provided in the cooling water vessel and allowing water to be supplied from an outside source to the cooling water vessel.

The dehumidifier determines a no-load operation of the water pump as a no-water condition in the cooling water vessel and issues an alarm.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the inventive concept will be described in detail with reference to the accompanying drawings. The inventive concept, however, may be modified in various different ways, and should not be construed as limited to the embodiments set forth herein. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present. The same reference denotations may be used to refer to the same or similar elements throughout the specification and the drawings.

Figure 1:
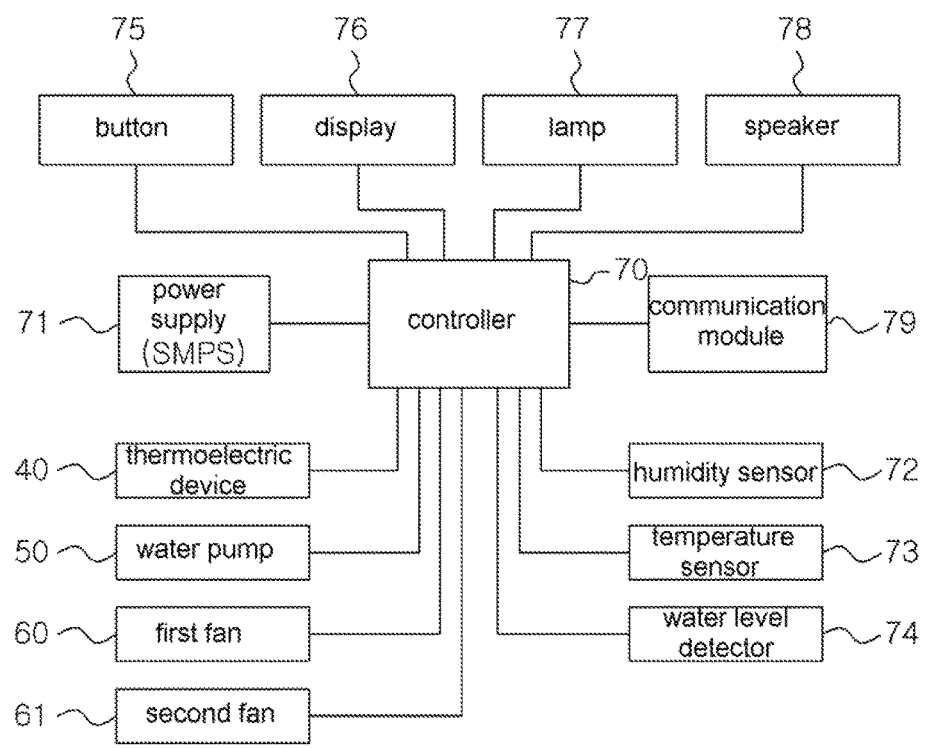
FIG. 1 is a block diagram illustrating electrical components of a dehumidifier according to an embodiment of present invention.

FIG. 1 is a block diagram illustrating electrical components of a dehumidifier according to an embodiment of present invention.

Referring to FIG. 1, the dehumidifier includes a power supply 71, e.g., a switched-mode power supply (SMPS), converting alternating current (AC) power to direct current (DC) power and supplying DC power for dehumidification, a humidity sensor 72 sensing a humidity of ambient air surrounding the dehumidifier, a temperature sensor 73 measuring a temperature of cooling water, a water level detector 74 measuring a water level of a water tank 30, a button 75 turning on and off the dehumidifier by controlling the power supply 71 or changing a predetermined value of threshold humidity, threshold temperature, and maintenance temperature, a display 76 displaying various information on a screen, a lamp 77 and a speaker 78 for alerting a user, a communication module 79, e.g., comprising a Bluetooth or Wi-Fi module, provided for communication with a smart phone, a thermoelectric device 40 having a heating part and a cooling part simultaneously in opposite sides, a water pump 50 circulating cooling water, and a first fan 60 and a second fan 61 inducing an air flow.

The components, e.g., 71, 72, 73, 74, 75, 76, 77, 78, 79, 40, 50, 60, and 61, may be connected to a controller 70. The components e.g., 71, 72, 73, 74, 75, 76, 77, 78, 79, 40, 50, 60, and 61, together with the controller 70, may be mounted in a housing 10 having a cooling water vessel 20 and a water tank 30 to perform dehumidification under the control of the controller 70.

Figure 2A:
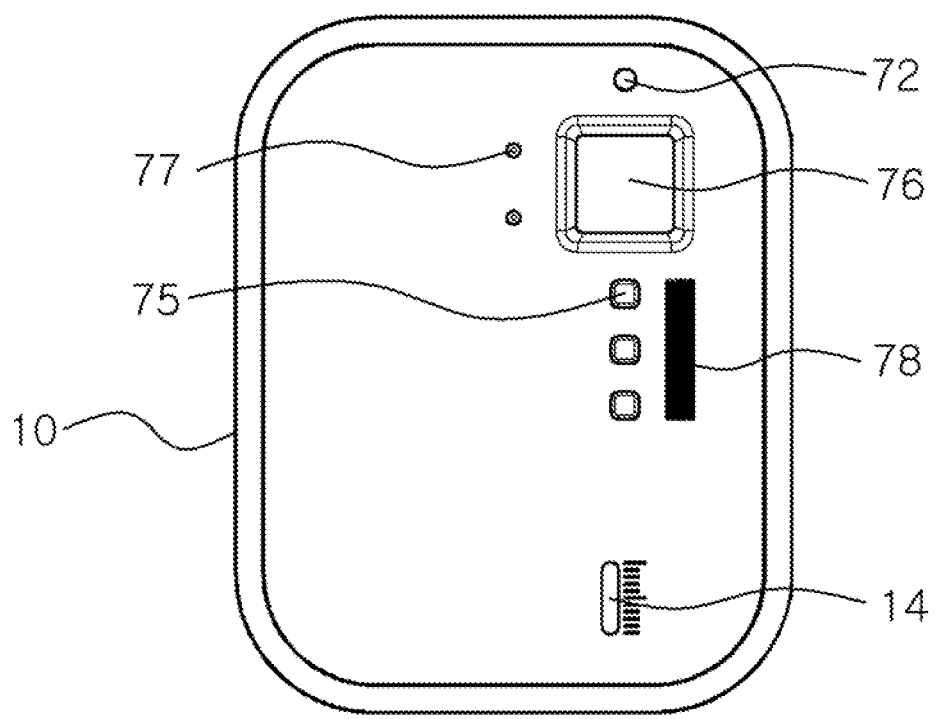
FIGS. 2A and 2B, respectively, are a front view and a front perspective view illustrating a dehumidifier according to an embodiment of present invention.
Figure 2B:
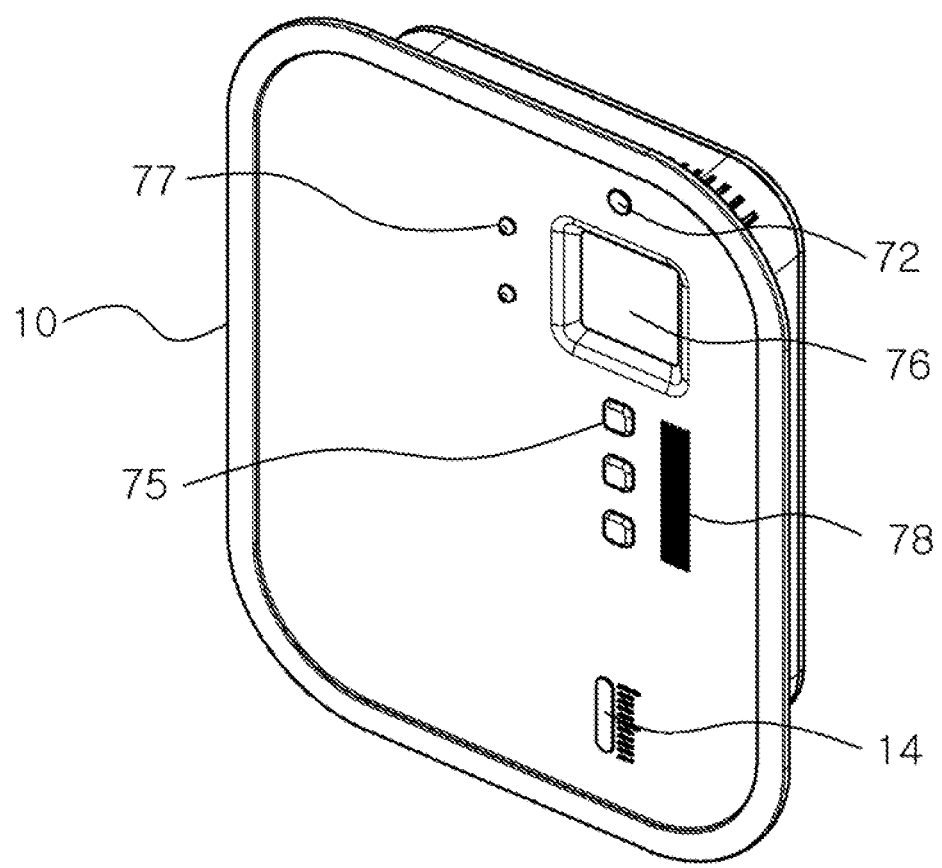

FIGS. 2A and 2B, respectively, are a front view and a front perspective view illustrating a dehumidifier according to an embodiment of present invention.

Figure 3A:
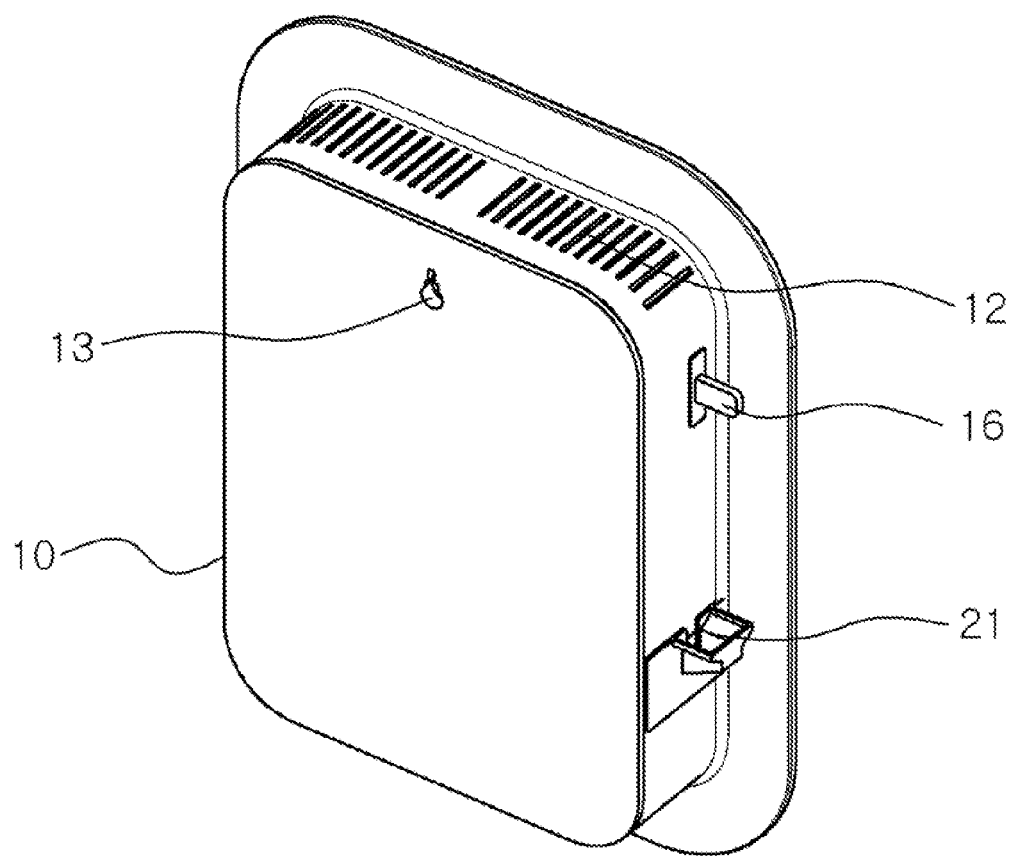
FIGS. 3A and 3B, respectively, are left-side and right-side rear perspective views illustrating a dehumidifier according to an embodiment of present invention.
Figure 3B:
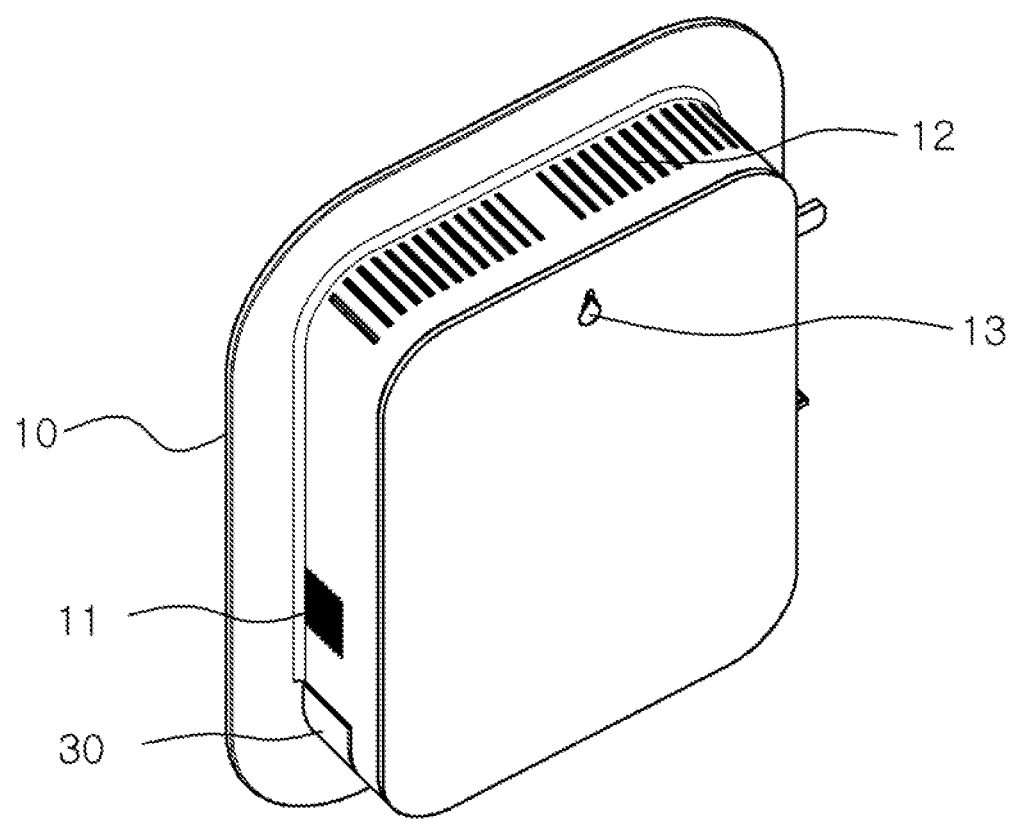

FIGS. 3A and 3B, respectively, are left-side and right-side rear perspective views illustrating a dehumidifier according to an embodiment of present invention.

Figure 4:
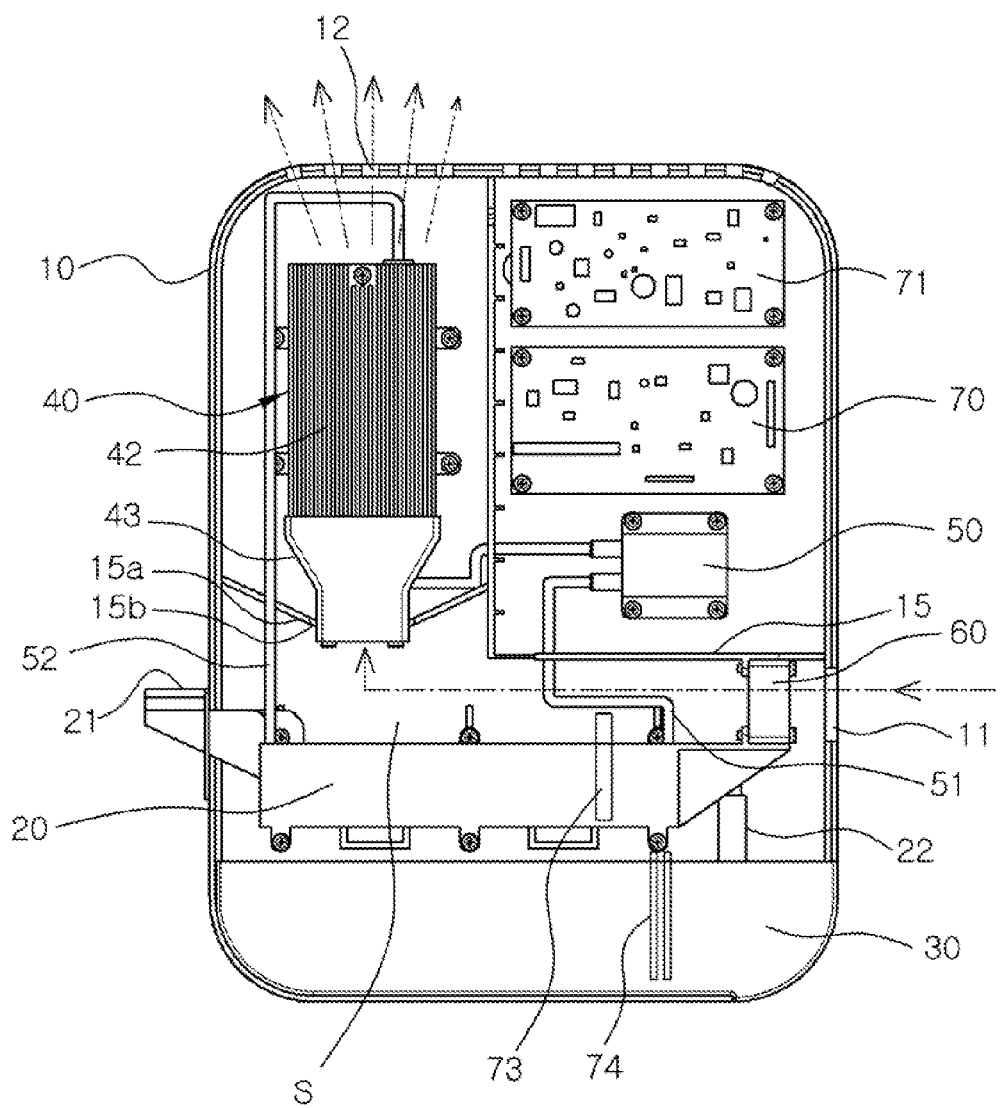
FIG. 4 is a view illustrating an internal structure of a housing of a dehumidifier, with a front, top, side, and bottom plate of the housing removed, according to an embodiment of the present invention.
Figure 5:
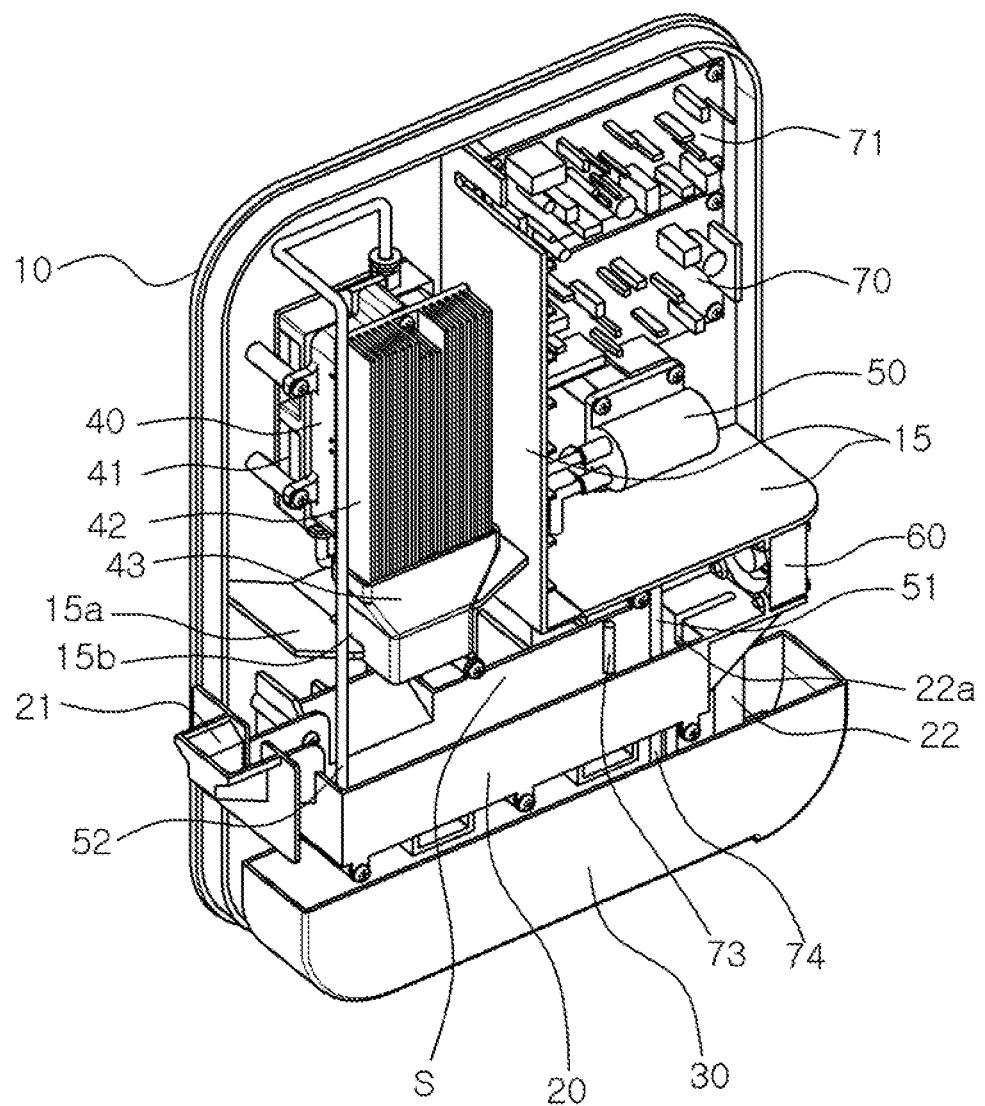
FIG. 5 is a front perspective view of a dehumidifier as shown in FIG. 4.

FIG. 4 is a view illustrating an internal structure of a housing of a dehumidifier, with a front, top, side, and bottom plate of the housing removed, according to an embodiment of the present invention. FIG. 5 is a front perspective view of a dehumidifier as shown in FIG. 4.

Figure 6A:
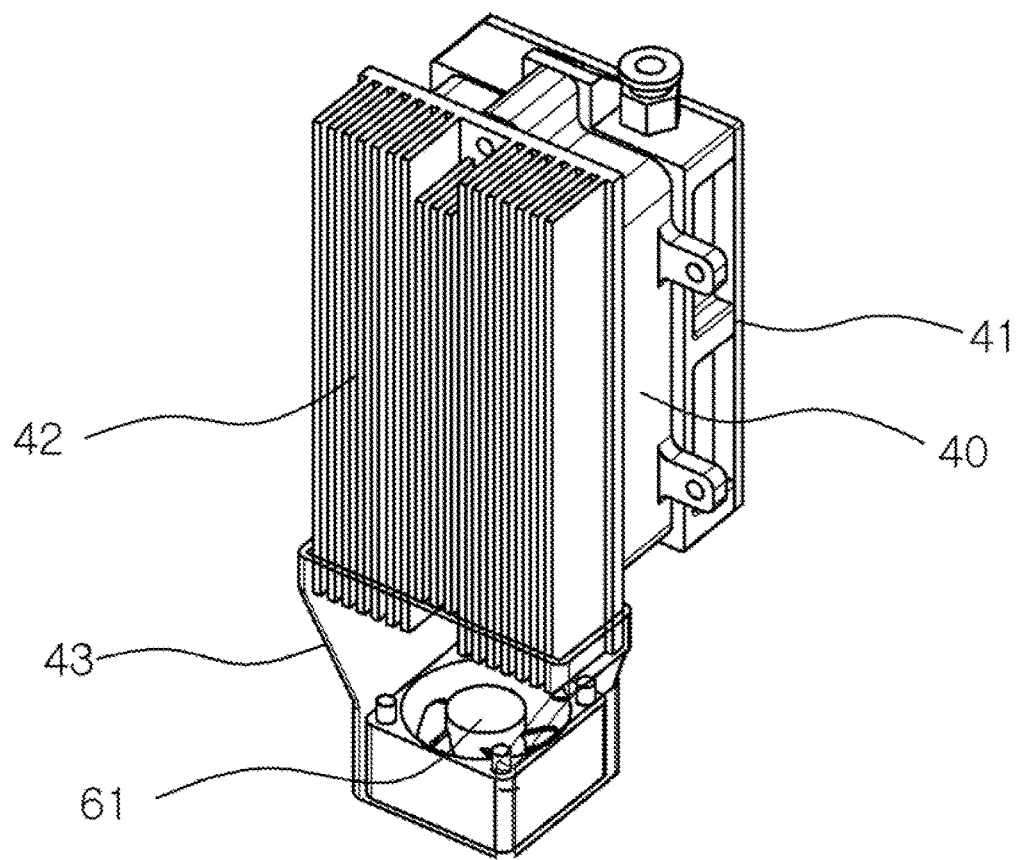
FIG. 6A is a perspective view illustrating a thermoelectric device of a dehumidifier according to an embodiment of the present invention.
Figure 6B:
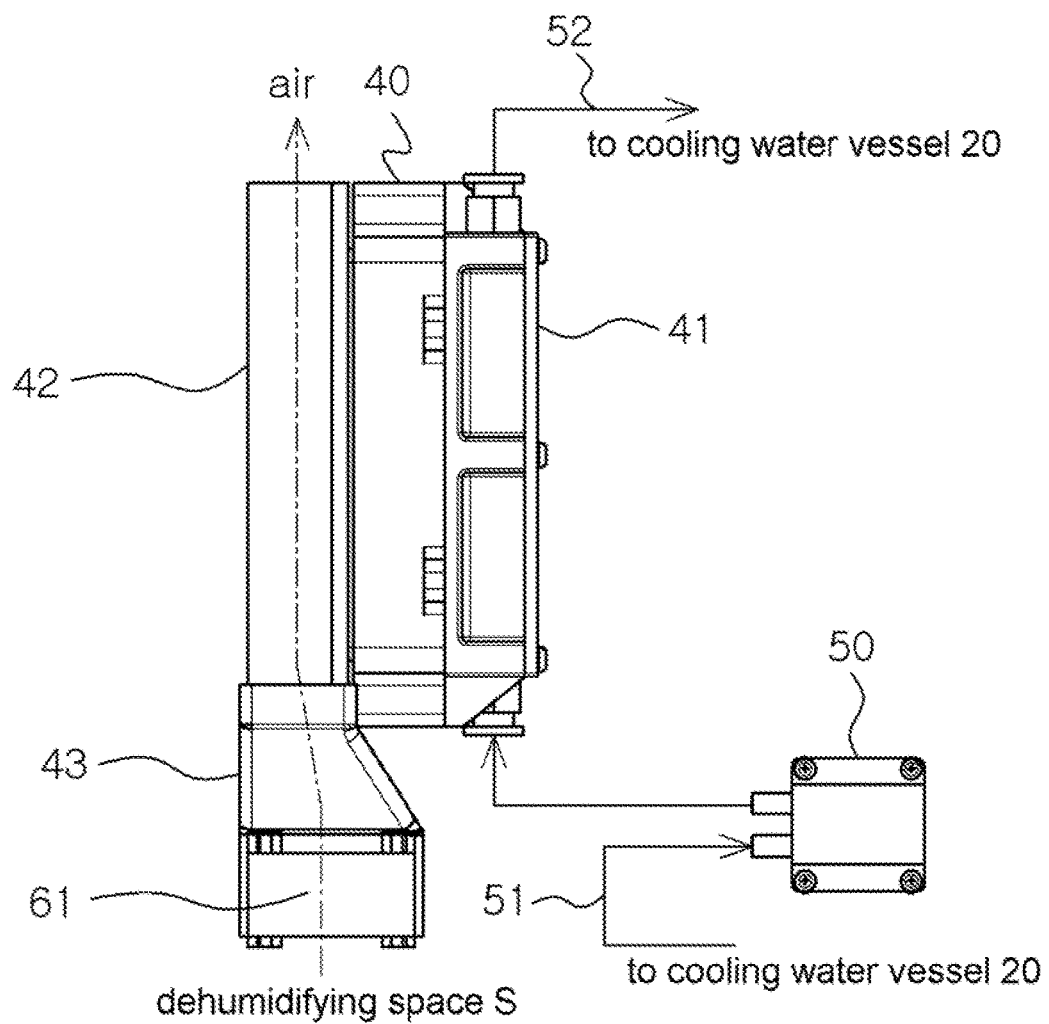
FIG. 6B is a side view illustrating a thermoelectric device of a dehumidifier, wherein an air and cooling water flow through the thermoelectric device is shown, according to an embodiment of the present invention.

FIG. 6A is a perspective view illustrating a thermoelectric device of a dehumidifier according to an embodiment of the present invention. FIG. 6B is a side view illustrating a thermoelectric device of a dehumidifier, wherein an air and cooling water flow through the thermoelectric device is shown, according to an embodiment of the present invention.

The housing 10 has a relatively small depth as compared with its length and width, allowing the dehumidifier to be hung on a wall in an easier or convenient way in use.

The inside of the housing 10 includes the water tank 30. The water tank 30 is provided at a lowermost end of the housing 10, has an upper end that is opened upwardly, and is formed to be long in a width direction thereof. The cooling water vessel 20 is provided above the water tank 30, has an upper end opened upwardly, and is formed to be long in a width direction thereof.

The first fan 60 is placed above a side (e.g., a right side) of the cooling water vessel 20 in a width direction of the cooling water vessel 20 and allowing air to flow into an upper space of the cooling water vessel 20. The thermoelectric device 40 is provided above another side (e.g., a left side) of the cooling water vessel 20 in a width direction of the cooling water vessel 20. The controller 70, the power supply 71, and the water pump 50 are provided in a right upper space that is partitioned by a wall 15 from a space in which the cooling water vessel 20, a water tank 30, the thermoelectric device 40, and the first fan 60 are installed.

The cooling water vessel 20 has an upper end opened upwardly and is shaped as a long vessel or container extending from a lower portion of a side (left side) where the first fan 60 is placed to a lower portion of the other side (right side) where the thermoelectric device is placed in a width direction. Accordingly, a dehumidifying space S where air is dehumidified while staying above the cooling water contained in the cooling water vessel 20 is formed to have a long passage shape along a width direction of the cooling water vessel 20.

The dehumidifying space S may be positioned above the cooling water vessel 20. The dehumidifying space S may be provided so that an upper portion of the dehumidifying space S is covered by the wall 15 enclosing the controller 70, the power supply 71, and the water pump 50 and a hopper-shaped wall 15a partitioning the thermoelectric device 40.

An inlet port 11 is formed in a side plate (e.g., a left side plate) of the housing 10 positioned adjacent to the first fan 60. The inlet port 11 may be provided at a side of the housing 10 corresponding to a position of the first fan 60. The inlet port 11 may be positioned opposite the first fan 60. The inlet port 11 and the first fan 60 may be aligned along a direction where air is introduced from outside of the housing 10. As the first fan 60 operates, air may be introduced from outside the housing 10 through the inlet portion 11 to the inside of the housing 10, and the air may flow through the dehumidifying space S. The air may be brought in contact with the cooling water and dehumidified while flowing through the dehumidifying space S along a width direction (a left to right direction) of the cooling water vessel 20 above the cooling water prior to arriving at a bottom space of the thermoelectric device 40.

The thermoelectric device 40 may dissipate heat dissipation at a first side device thereof and absorb heat at a second side (e.g., an opposite side of the first side) thereof by the Peltier effect, e.g., when supplied with electric power. The second side of the thermoelectric device 40 may be used device for cooling. The first side and the second side of the thermoelectric device 40 may be herein referred to as a heating part and cooling part, respectively.

For example, the thermoelectric device 40 may include, but is not limited to, a Peltier cooler or a thermoelectric heat pump.

According to an exemplary embodiment of present invention, the thermoelectric device 40 is installed above the dehumidifying space S, such that heating and cooling parts of the thermoelectric device 40 are positioned to be perpendicular to the dehumidifying space S. Heat exchange occurs between air and the thermoelectric device 40 while air rises through the heating part and between the cooling water and the thermoelectric device 40 while the cooling water passes through the cooling part of the thermoelectric device 40. Further, a heat sink 42 is provided to come into surface contact with the heating part. The heat sink includes a plurality of cooling fins extending vertically to thus increase contact surface between the heating part and air passing therethrough, thereby resulting in an increase in heat exchange efficiency. A cooling tank 41 is provided to come into contact with the cooling part of the thermoelectric device 40. The cooling tank 41 includes a water inlet at a bottom and a water outlet at a top thereof, and the cooling tank 41 is provided with a plurality of fins extending vertically to increase contact surface, i.e., heat exchange efficiency, between the thermoelectric device 40 and water passing therethrough.

An air outlet 12 is provided in the top plate of the housing 10 corresponding to an upper portion of the heat sink 42, and air is discharged through the heat sink 42 and the air outlet 12 to an outside of the housing 10. Air introduced in the housing 10 through the air inlet 11 is dehumidified by contact with the cooling water in the dehumidifying space S, heated upon passing through the heating part of the thermoelectric device 40, and then discharged to the outside of the housing 10.

As illustrated in FIG. 6, the hopper 43 equipped with the second fan 61 is installed at a lower end of the heat sink 42. The hopper 43 may have a vertically-penetrative structure. For example, the hopper 43 may have a hollow structure. An upper portion of the hopper 43 connected to a lower end of the heat sink 42 is larger than a lower portion thereof connected to the dehumidifying space S, and thus the second fan 61 forces the dehumidified air to flow toward the heat sink 42. For example, air control is achieved in such a way that external air is introduced into the dehumidifying space S by an operation of the first fan 60 and then discharged through the air outlet 12 by the second fan 61 after passing through the heat sink 42.

Since the air outlet 12 is provided in the top plate of the housing 10 and the heated air through the heat sink 42 tends to ascend, smooth and efficient air flow may be achieved. For example, according to an exemplary embodiment of present invention, when the humidifier is installed at an upper portion of a bathroom wall, the heated air stays close to a bathroom ceiling, and thus air can be easily discharged out of the bathroom through a bathroom ventilator. In this way, discomfort caused by the warm air coming out of the humidifier can also be readily removed.

The cooling water contained inside the cooling water vessel 20 is cooled down while circulated through the cooling part of the thermoelectric device 40 by the water pump 50.

The water pump 50 is connected with piping to forcedly convey cooling water from a side (also referred to as a first side) of the cooling water vessel 20 through an intake tube 51 to the cooling tank 41. Cooling water is cooled down by heat exchange in the cooling tank 41 and flows back to another side (also referred to as a second side) of the cooling water vessel 20 through a discharge tube 52. As such, the water pump 50 may pump the cooling water in the cooling water vessel 20 through a circulation passage including the cooling tank 41.

The circulation of the cooling water by the water pump 50 creates a water flow in a direction from the second side of the cooling water vessel 20 to the first side thereof, which is an opposite direction of the flow of air introduced by the first fan 60, allowing the water flow to be resistant to the air flow. Such resistance to the air flow may lead to increased dehumidification efficiency.

The cooling tank 41, even when thermally insulated by a heat insulator, may create condensation. A hopper-shaped barrier narrowing downwards may be provided between the dehumidifying space S and a space where the thermoelectric device 40 is installed to have a lower portion of the hopper 43 pass therethrough, with a gap 15b from an edge of the lower portion of the hopper 43, allowing condensation to be collected to the cooling water vessel 20 from an outer surface thereof.

The cooling water vessel 20 is provided with the temperature sensor 73. The controller 70 uses a temperature measured by the temperature sensor 73 to maintain the cooling water at a predetermined temperature.

According to an embodiment of the present invention, a water supplying inlet 21 is formed at the second side of the cooling water vessel 20 to pass through the left plate of the housing 10 to the outside of the housing 10, allowing for adding water.

An opening may be formed in a side plate (e.g., a right or left side plate) of the housing 10 to allow the water tank 30 to be placed in or out of the housing 10 under the cooling water vessel 20. A drain tube 22 is provided to drain the cooling water from the cooling water vessel 20 to the 30 when the cooling water exceeds a predetermined water level. A groove 22a is formed in the cooling water vessel 20 to extend downwards from the predetermined water level. An upper end of the drain tube 22 is connected to the groove 22a, and a lower end of the drain tube 22 sags towards the water tank 30.

Accordingly, if the water level inside the cooling water vessel 20 rises due to the dehumidification, water may be drained to the water tank 30 and adjusted to a predetermined water level to be prevented from inundation. When the cooling water in the water tank 30 reaches a predetermined water level, the water tank 30 may be removed from the housing 10, emptied out, and mounted back in the housing 10. When the water level in the cooling water vessel 20 decreases due to evaporation while the dehumidifier is not used, water can be furnished through the water supply opening 21.

According to an exemplary embodiment of present invention, a water level detector 74 is installed in the water tank 30. When the water level of the water tank 30 increases beyond a predetermined water level, the controller 70 may enable the lamp 77 or speaker 78 to generate an alert advising the user to empty the water tank 30.

For example, the water level detector 74 may include two conductors spaced apart from each other, with a voltage applied thereto. The respective lower portions of the conductors may be placed on the predetermined water level of the water tank 30, so that arrival of the water in the water tank 30 to the predetermined water level allows an electric current to flow between the conductors, thereby putting the user on the alert.

The controller 70 may operate the water pump 50. The controller 70 may determine whether the water pump 50 operates with or without a load. Upon determining that the water pump 50 operates with no load, the controller 70 may determine that there is little or no cooling water in the cooling water vessel 20 or that water is required to be added to the cooling water vessel 20, and the controller 70 may enable the lamp 77 or speaker 78 to generate an alert. For example, the lamp 77 may generate a light radiation as the alert, and the speaker 78 may generate a sound as the alert.

The humidity sensor 72, the button 75, the display 76, the lamp 77, and the speaker 78 may be provided on a front plate of the housing 10, allowing for exact measurement of the humidity in ambient air and easier interfacing with the user. A transparent or see-through window is provided in the front plate of the housing 10 to allow the user to identify or notice the water level of the water tank 30 at the naked eye.

The right plate of the housing 10 includes the air inlet 11 at a position slightly above an upper end of the cooling water vessel 20 and the opening under the air inlet 11 to expose a lateral side of the water tank 30 and to allow the water tank 30 to be pull in and out of the housing 10.

Also, the water supplying inlet 21 penetrating the housing 10 and protruding to the outside thereof is provided at the left side of the housing 10, such that water can be supplied therethrough.

According to an exemplary embodiment of present invention, an air freshener cartridge 16 is installed in the left plate of the housing 10 in a position corresponding to a height of the thermoelectric device 40. The air freshener cartridge 16 may be a container including a liquid, solid, or jelly-type air freshener. The air freshener cartridge 16 has a portion positioned inside the housing 10 that contacts the heat sink 42 attached to the heating part of the thermoelectric device 40 to receive heat from the heat sink 42. Accordingly, as the thermoelectric device 40 operates, the air freshener cartridge 16 may produce an air refreshing effect, such as refreshing air or emitting fragrance.

The air outlet 12 is formed in the top plate of the housing 10 in a position corresponding to an upper portion of the thermoelectric device 40 and allows air to be discharged after passing through the heat sink 42. A hole may be provided to communicate the space in which the controller 60 and the power supply 71 are placed with an external space, so as to dissipate heat generated from the controller 60 and the power supply 71.

A wall mount hole 13 is provided in the rear plate of the housing 10 to hang the dehumidifier on a wall. The wall mount hole 13 may be formed in various shapes or structures, including a hook.

The controller 70 may include a software program or may be configured or programmed to perform a first dehumidifying operation or a second dehumidifying operation.

For example, when configured to perform the first dehumidifying operation, the controller 70 may operate the first and second fans 60 and 61 to introduce external air into the dehumidifying space S and dehumidify the air through the cooling water in the cooling water vessel 20 and to forcedly drain the dehumidified air through the heat sink 42 to the outside of the housing 10 when a humidity measured by the humidity sensor 72 exceeds a predetermined threshold humidity. When a temperature of the cooling water in the cooling water vessel 20 measured by the temperature sensor 73 exceeds a predetermined threshold temperature during the dehumidifying operation, the controller 70 may supply electricity to the thermoelectric device 40 while operating the water pump 50 to circulate the cooling water so that the cooling water is left at the predetermined threshold temperature.

According to the first dehumidifying operation, the first and second fans 60 and 61 may stop operation except that dehumidification is performed, and the thermoelectric device 40 and the water pump 50 may stop operation except for when cooling down the cooling water, which leads to a reduced power consumption threshold Alternatively, the controller 70 may keep the cooling water temperature lower than the threshold temperature while operating the first and second fans 60 and 61 when the humidity exceeds the threshold humidity.

According to an embodiment of present invention, the controller 70 may be configured to perform the second dehumidifying operation to expedite dehumidification while reducing power consumption.

The controller 70 configured to perform the second dehumidifying operation may control electric power supplied to the thermoelectric device 40 to enable the thermoelectric device 40 to run in a low-power operation mode or a full-power operation mode. The controller 70 may be programmed to perform a control operation as shown in Table 1.

TABLE 1

| Circumstantial variable | | Operational State | | | |
|---|---|---|---|---|---|
| Humidity | Cooling Water Temperature | Thermoelectric Device | Water Pump | First Fan | Second Fan |
| Above Threshold Humidity | Above Threshold Temperature | Full-Power Operation | Operation | Operation | Operation |
| | Below Threshold Temperature | Low-Power Operation | Operation | Operation | Operation |
| Below Threshold Humidity | | Stop | Stop | Stop | Stop |

Here, the term "low-power operation (mode)" may refer to an operation performed while supplying the thermoelectric device 40 with a low level of electric power at which no conductive heat exchange occurs between the heating part (or the heat sink) and the cooling part (or the water tank) of the thermoelectric device 40. In other words, no thermal conductance-based heat exchange occurs between the heating part and the cooling part in the low-power operation mode.

The term "full-power operation (mode)" may refer to an operation performed while providing a relatively higher level of electric power than the electric power provided during the low-power operation. The full-power operation may correspond to an operation performed to decrease the cooling water down to the threshold temperature or less.

The thermoelectric device 40, when supplied with no electricity, becomes a thermal conductor that functions as a thermal transfer path between the heating part (or the heat sink) and the cooling part (or the cooling tank). Thus, a cutoff of electricity supply causes thermal conductance so that the cooling part is the same in temperature as the heating part. Therefore, it may take time to decrease the temperature of the cooling water to the threshold temperature by resuming the supply of electricity.

A relative humidity may represent a ratio of the amount of water vapor in the atmosphere to the amount of saturated water vapor at a current temperature and may be directly related with a discomfort index. The relative humidity can be decreased as the amount of saturated water vapor at a current temperature increases, which can be achieved by heating the dehumidified air.

Accordingly, when the humidity is equal to or lower than the threshold humidity in the second dehumidifying operation, the thermoelectric device 40, the water pump 50, and first and second fans 60 and 61 may be stopped from operation. When the humidity is increased above the threshold humidity, the water pump 50 and fans 60 and 61 may remain in operation while the thermoelectric device 40 may be operated in the low-power or the full-power operation mode.

Accordingly, when the water cooling temperature decreases below the threshold temperature, the low-power operation mode may be performed to prevent conductive heat exchange in the thermoelectric device 40 and to slightly heat up and discharge the dehumidified air to decrease the relative humidity while gradually increasing the cooling water temperature gradually. When the water cooling temperature exceeds the predetermined threshold temperature, the thermoelectric device 40 may be run in a full-power operation mode to quickly decrease the cooling water temperature.

When the humidity is equal to or lower than the threshold humidity, the controller 70 may be programmed, as shown in Table 2, to maintain the cooling water temperature within a predetermined maintenance temperature range by enabling the thermoelectric device 40 to interoperate with the water pump 50 and the second fan 61.

Here, the maintenance temperature range may include a predetermined range set to be relatively higher than the threshold temperature.

example, when the threshold temperature is set to 5° C., and the maintenance temperature range is set to a range from 10° C. to 15° C., the dehumidification may be rarely achieved by using the cooling water within such maintenance temperature range.

When the cooling water temperature reaches a lower limit of the maintenance temperature range, the thermoelectric device 40 may be enabled to operate in the low-power operation mode, and the water pump 50 and the second fan 61 may be stopped. The low-power operation may prevent conductive heat exchange between the heating part and the cooling part thereof when the thermoelectric device 40 stops running.

As such, the thermoelectric device 40 operates at the threshold humidity or less, and the cooling water temperature is kept below the maintenance temperature, such that the cooling water temperature can be quickly decreased upon beginning the dehumidification.

The button 75 may be used to set or adjust threshold temperature, threshold humidity, and upper and lower limits of the maintenance temperature range and to turn on or off the dehumidifier. A plurality of buttons 75 may be provided for setting or adjusting the threshold temperature, threshold humidity, and the maintenance temperature range, respectively.

The display 76 may display, e.g., a current humidity or cooling water temperature.

A plurality of lamps 77, respectively, may be used to display on-off states of the dehumidifier or alerts.

TABLE 2

| Circumstantial variable | | Operational State | | | |
|---|---|---|---|---|---|
| Humidity | Cooling Water Temperature | Thermoelectric Device | Water Pump | First Fan | Second Fan |
| Above Threshold Humidity | Above Threshold Temperature | Full-Power Operation | Operation | Operation | Operation |
| | Below Threshold Temperature | Low-Power Operation | Operation | Operation | Operation |
| Below Threshold Humidity | Reaching Maintenance Temperature Upper Limit | Full-Power Operation | Operation | Stop | Operation |
| | Reaching Maintenance Temperature Lower Limit | Low-Power Operation | Stop | Stop | Stop |

According to Table 2, when the humidity is equal to or lower than the threshold humidity, the thermoelectric device 40 may be operated in the full-power or the low-power operation mode depending on the cooling water temperature.

For example, when the cooling water temperature reaches an upper limit of the maintenance temperature range, the thermoelectric device 40 may be operated in the full-power operation mode, and the water pump 50 and the second fan 61 may be operated. The full-power operation may last until the cooling water temperature reaches a lower limit of the maintenance temperature range.

The water pump 50 circulates the cooling water to reduce the temperature of the cooling water in the cooling water vessel 20. The second fan 61 may be operated to reduce heat generated from the heating part (or the heat sink) caused by the full-power operation of the thermoelectric device 40. In this case, although the first fan 60 is not operated, external air may be introduced to the dehumidifying space S through the air inlet 11. However, since the cooling water temperature is maintained higher than the threshold temperature, little or no dehumidification effect may be achieved. For The communication module 79 communicates with a smart phone, e.g., based on a Bluetooth connection. The controller 70 may be configured to send out an alert to the smart phone or to receive a music file from the smartphone and play the received music file.

According to an embodiment of the present invention, the dehumidifier may be programmed to interwork with a weather application (simply referred to as an app) installed on the smartphone by short-range wireless communication through the communication module 79 to receive a current humidity and to adjust the threshold humidity depending on the humidity of outdoor air. For example, the threshold humidity may be adjusted to decrease as the outdoor humidity increases.

Figure 7:
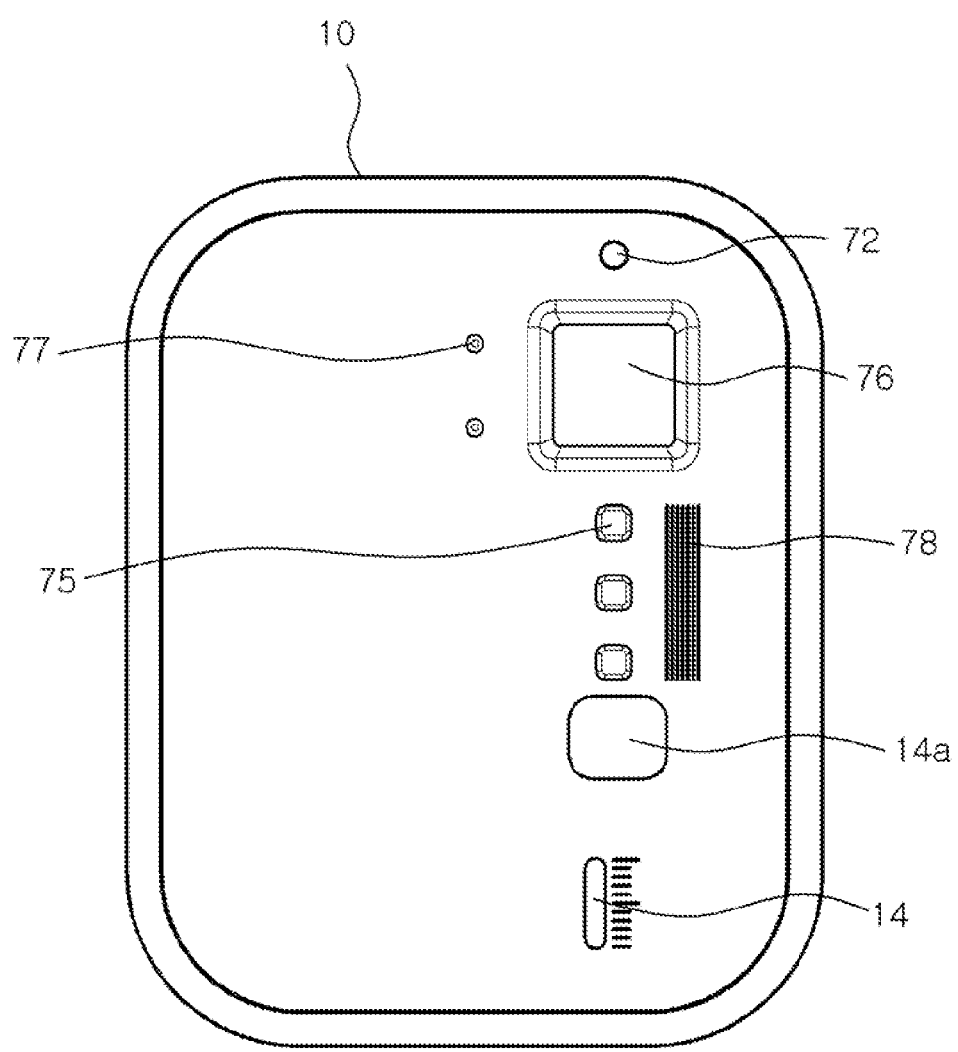
FIG. 7 is a front view illustrating a dehumidifier according to an exemplary embodiment of present invention.
Figure 8:
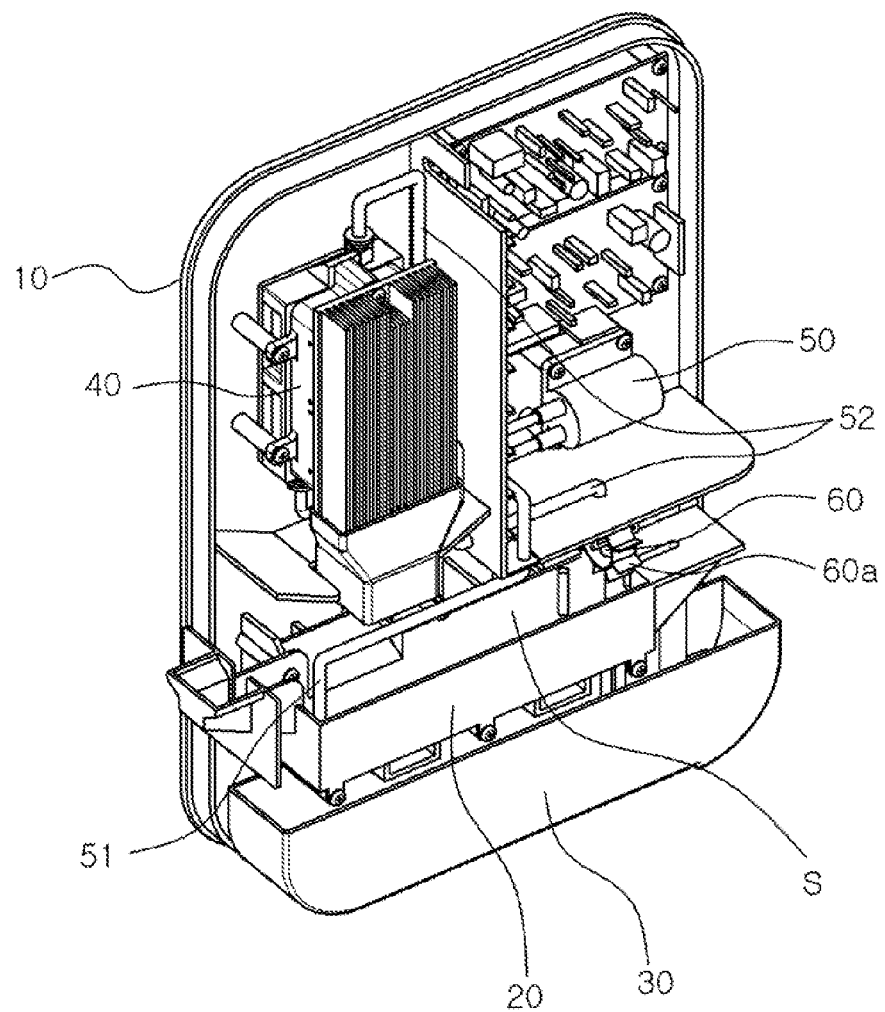
FIG. 8 is a font perspective view illustrating an internal structure of a housing of a dehumidifier, with a front, top, side, and bottom plate of the housing removed, according to an exemplary embodiment of present invention.

FIG. 7 is a front view illustrating a dehumidifier according to an exemplary embodiment of present invention. FIG. 8 is a font perspective view illustrating an internal structure of a housing of a dehumidifier, with a front, top, side, and bottom plate of the housing removed, according to an exemplary embodiment of present invention.

Figure 9:
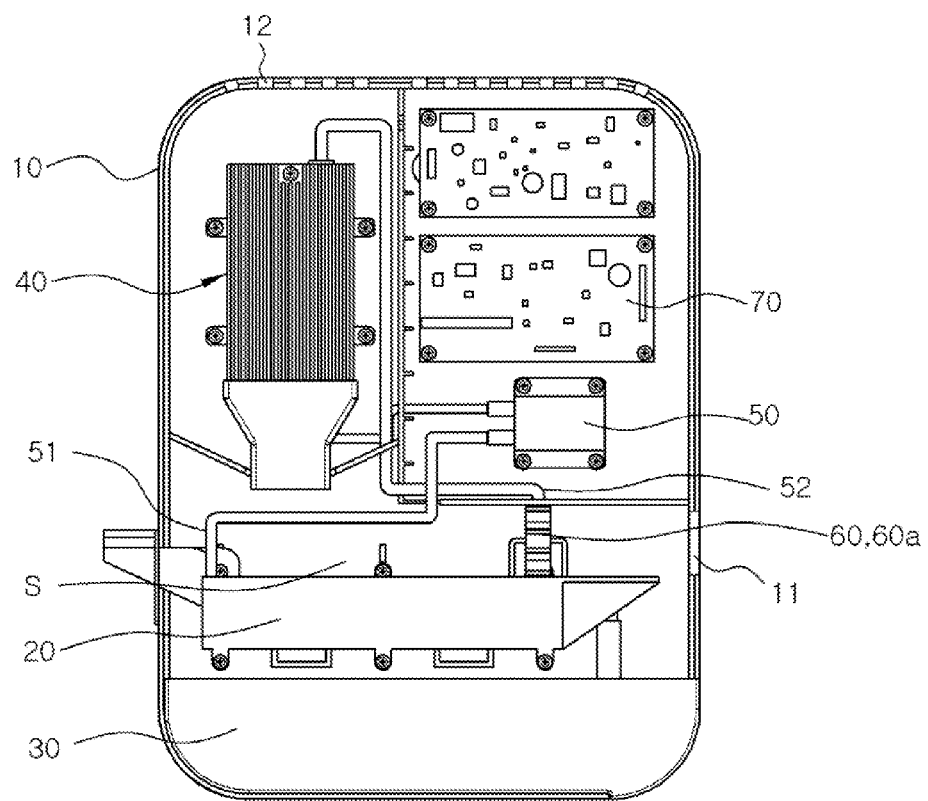
FIG. 9 is a front view of a dehumidifier as shown in FIG. 8.

FIG. 9 is a front view of a dehumidifier as shown in FIG. 8.

Referring to FIGS. 7 to 9, the first fan 60 may be formed to be assembled with a waterwheel 60a that surrounds the first fan 60 along a circumferential direction of the first fan 60. The first fan 60 and the waterwheel 60a may form a single body or may be integrally formed with each other. Rotation of the waterwheel 60a allows external air to flow into the dehumidifying space S through the air inlet 11.

The first fan 60 is disposed on the water surface at the first side of the cooling water vessel 20, and the discharge tube 52 is installed in such a way that an end portion of the discharge tube 52 is vertically positioned above the waterwheel 60a. The waterwheel 60a rotates as the cooling water drops to the cooling water vessel 20. The first fan 60 may be operated by an electric motor in the embodiment described above in connection with FIGS. 1 to 6. However, the fan-waterwheel assembly can rotate without electric power.

Since the discharge tube 52 is disposed above the first fan 60, the intake tube 51 may be provided below the thermoelectric device 40 to pull in the cooling water of the cooling water vessel 20.

Further, as shown in FIG. 7, the front plate of the housing 10 is provided with a transparent window 14a corresponding to a position of the first fan 60 assembled with the waterwheel 60a, so the waterwheel 60a can be viewed therethrough. In this way, the dehumidifier can also play a role as a decorative sculpture.

Also, an operation of the water pump 50 may be monitored at the naked eye through transparent window 14a.

As described above in connection with Table 2, when the humidity exceeds the threshold humidity, the water pump 50 and the first fan 60 may run together, but when the ambient humidity is equal to or lower than the threshold humidity, the water pump 50 may or may not operate while the first fan 60 remains stopped depending on the cooling water temperature.

While the cooling water is maintained at a maintenance temperature that presents a relatively weak dehumidification effect as compared with the threshold temperature, the dehumidification efficiency is limited despite an operation of the first fan. Thus, an interoperation between the assembly of the waterwheel 60a and the first fan 60 and the water pump 50 would not make a significant difference from the operation described above in connection with Table 2.

When running the thermoelectric device 40 in the full-power operation mode, the operation of both the first and second fans 60 and 61 may lead to more heat dissipation from the heating part than the operation of the second fan 61 alone does.

According to an embodiment of the present invention, the dehumidifier may provide air purification because the cooling water may remove fine-particle impurities (e.g., dust) from the air when the air passes through the dehumidifying space S.

For example, an end portion of the discharge tube 52 may be placed above the cooling water vessel 20, so that the cooling water circulated through the cooling part and the discharge tube 52 by the water pump 50 may drop to the cooling water vessel 20. The dropping water may capture or remove the fine impurities from the air passing through the dehumidifying space S.

According to an embodiment of the present invention, an end portion of the discharge tube 52 may be provided with a water sprayer (not shown) to further increase the removal efficiency of fine impurities.

For example, the water sprayer may have a configuration that sprays the cooling water spurting from the discharge tube 52 to the dehumidifying space S through multiple nozzles or that forces the cooling water to collide with an impingement baffle that may then spread the cooling water to the dehumidifying space S. Since the cooling water is forcedly spurted from the discharge tube 52 by the water pump 50, the cooling water may be spread to the dehumidifying space S by using nozzles or an impingement baffle.

According to an embodiment of the present invention, the dehumidifier may introduce external air into the housing, allow the introduced air to flow over a cold surface of cooling water to dehumidify the air, and turn on or off the thermoelectric device so that the thermoelectric device may cool down the cooling water when the temperature of the cooling water exceeds a predetermined threshold.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A dehumidifier introducing external air through an air inlet to an inside thereof, dehumidifying the introduced air using a thermoelectric device powered on/off by a controller in the dehumidifier, and discharging the dehumidified air through an air outlet, wherein a dehumidifying space is formed on a water surface of a cooling water vessel containing cooling water, so that the air is introduced to the dehumidifying space and dehumidified by the cooling water, wherein the dehumidified air in the dehumidifying space is heated by a heating part of the thermoelectric device and is then discharged through the air outlet, wherein the cooling water in the cooling water vessel is circulated by a water pump and cooled through a cooling part of the thermoelectric device, wherein the cooling water vessel extends from a lower portion of the air inlet at a first side of the dehumidifier to a lower portion of the thermoelectric device at a second side of the dehumidifier, wherein the dehumidifying space is formed as a passage extending from the air inlet at the first side to the thermoelectric device at the second side, and wherein a first fan is provided at the air inlet so that the air introduced into the dehumidifying space by the first fan passes along the water surface of the cooling water contained in the cooling water vessel to the heating part of the thermoelectric device, wherein a second fan is provided at a lower end of the heating part of the thermoelectric device, wherein the air outlet is provided at an upper portion of the heating part of the thermoelectric device, and wherein the air in the dehumidifying space is ascended by the second fan and is discharged through the heating part of the thermoelectric device and through the air outlet, wherein the dehumidifier comprises a temperature sensor measuring a temperature of the cooling water in the cooling water vessel and a humidity sensor measuring a humidity of the external air, wherein the controller operates the first fan and the second fan when the humidity exceeds a predetermined threshold humidity to perform dehumidification, and when the temperature of the cooling water measured while the dehumidification exceeds a predetermined threshold temperature, the controller supplies electricity to the thermoelectric device while circulating the cooling water by the water pump so that the temperature of the cooling water remains at the threshold temperature or less.

2. The dehumidifier of claim 1, wherein the controller 70 controls power supplied to the thermoelectric device to perform a low-power operation and a full-power operation where relatively higher power is supplied than power supplied during the low-power operation, wherein when the humidity is a threshold humidity or less, the controller stops the thermoelectric device, the water pump, and first and second fans, and when the humidity exceeds the threshold humidity, the controller operates the water pump and the first and second fans while running the thermoelectric device in the full-power operation when the temperature of the cooling water exceeds a predetermined threshold temperature and in the low-power operation when the temperature of the cooling water is the threshold temperature or less.

3. The dehumidifier of claim 2, wherein when the humidity is the threshold humidity or less, the controller stops the first fan, and wherein when the temperature of the cooling water reaches an upper limit of a maintenance temperature range previously set to be relatively higher than the threshold temperature, the controller runs the thermoelectric device in the full-power operation and operates the water pump and the second fan, and when the temperature of the cooling water reaches a lower limit of the maintenance temperature range previously set to be higher the threshold temperature and lower than the upper limit of the maintenance temperature range, the controller runs the thermoelectric device in the low-power operation and stops the water pump and the second fan.

4. The dehumidifier of claim 1, wherein a water tank is disposed under the cooling water vessel, and wherein a water level of the cooling water vessel is adjusted by a drain tube draining the cooling water to the water tank when the water level of the cooling water vessel exceeds a predetermined water level.

5. The dehumidify of claim 4, wherein the cooling water vessel includes a water supplying inlet for adding water from an external source, wherein the water tank is externally removed, and wherein when the water pump operates with no load, the controller determines that the cooling water is not present in the cooling water vessel and generates an alert, and wherein the controller detects a water level of the water tank through a water level detector and generates an alert when the water level of the water tank exceeds a predetermined water level.

6. The dehumidifier of claim 1, wherein a waterwheel is provided to surround a circumference of the first fan, the waterwheel and the first fan forming a single body, wherein the extremal air is introduced by rotation of the waterwheel, and wherein the cooling water returned through the cooling part of the thermoelectric device to the cooling water vessel by the water pump is dropped to the cooling water vessel while rotating the waterwheel.

7. The dehumidify of claim 1, wherein the cooling water returned through the cooling part of the thermoelectric device to the cooling water vessel by the water pump is sprayed to the water surface of the cooling water vessel to remove dust in the air passing through the dehumidifying space over the water surface.

8. A dehumidifier, comprising:
a cooling water vessel containing cooling water;
a dehumidifying space formed above the cooling water vessel to which air is introduced through an air inlet;
a thermoelectric device including a heating part heating the air and a cooling part cooling the cooling water;
a water pump circulating the cooling water through the thermoelectric device;
a first fan disposed adjacent the air inlet to cause the air to flow through the dehumidifying space;
a controller controlling the thermoelectric device, the water pump, and the first fan;
a second fan disposed at a lower end of the heating part of the thermoelectric device;
an air outlet disposed at an upper portion of the heating part of the thermoelectric device, wherein the air is discharged from the dehumidifying space through the heating part of the thermoelectric device and through the air outlet to an outside of the dehumidifier by an operation of the second fan;
wherein when the humidity exceeds a predetermined threshold humidity, the controller operates the first and second fans to dehumidify the air; and
when the temperature of the cooling water exceeds a predetermined threshold temperature, the controller operates the water pump and the thermoelectric device to maintain the temperature of the cooling water below the threshold temperature.

9. The dehumidifier of claim 8, wherein the cooling water vessel extends from a lower portion of the air inlet to a lower portion of the thermoelectric device, wherein the dehumidifying space has a passage shape extending from a side of the air inlet to a side of the dehumidifier where the thermoelectric device is placed, and wherein the air introduced through the air inlet is dehumidified in the dehumidifying space and passes through the thermoelectric device.

10. The dehumidifier of claim 9, further comprises a humidity sensor measuring a humidity of the air and a temperature sensor measuring a temperature of the cooling water.

11. The dehumidifier of claim 10, wherein the thermoelectric device is operated in a low-power operation mode or a full-power operation mode by the controller.

12. The dehumidifier of claim 11, wherein when the humidity is equal to or lower than a predetermined threshold humidity, the thermoelectric device, the water pump, and the first and second fans do not operate, and when the humidity exceeds the predetermined threshold humidity, the thermoelectric device runs in the full-power operation mode when the temperature of the cooling water exceeds a predetermined threshold temperature, and the thermoelectric device runs in the low-power operation mode when the temperature of the cooling water is lower than the predetermined threshold temperature, while both the water pump and first and second fans operate.

13. The dehumidifier of claim 12, wherein when the humidity is equal to or lower than the predetermined threshold humidity, and the temperature of the cooling water reaches an upper limit of a predetermined maintenance temperature range, which is higher than the predetermined threshold temperature, the thermoelectric device runs in the full-power operation mode while the water pump and the second fan operate, and when the humidity is equal to or lower than the predetermined threshold humidity and the temperature of the cooling water reaches a lower limit of the predetermined maintenance temperature range, which is higher than the predetermined threshold temperature but lower than the upper limit of the predetermined maintenance temperature, the thermoelectric device runs in the lower-power operation mode while the water pump and the second fan do not operate.

14. The dehumidifier of claim 11, further comprises a water tank disposed below the cooling water vessel and a drain tube disposed between the cooling water vessel and the water tank, wherein of the cooling water is drained from the cooling water vessel to the water tank when a water level of the cooling water vessel reaches a predetermined level.

15. The dehumidifier of claim 14, comprises a water supplying inlet provided in the cooling water vessel and allowing water to be supplied from an outside source to the cooling water vessel.

16. The dehumidifier of claim 15, wherein the dehumidifier determines a no-load operation of the water pump as a no-water condition in the cooling water vessel and issues an alarm.

* * * * *